(12) United States Patent
Cluff

(10) Patent No.: US 7,191,269 B2
(45) Date of Patent: Mar. 13, 2007

(54) METHOD FOR MULTIPLE SENSORS TO COMMUNICATE ON A UNI-DIRECTIONAL BUS

(75) Inventor: Charles A. Cluff, Zionsville, IN (US)

(73) Assignee: Delphi Technologies, Inc., Troy, MI (US)

( * ) Notice: Subject to any disclaimer, the term of this patent is extended or adjusted under 35 U.S.C. 154(b) by 131 days.

(21) Appl. No.: 10/903,543

(22) Filed: Jul. 30, 2004

(65) Prior Publication Data

US 2005/0073403 A1 Apr. 7, 2005

Related U.S. Application Data

(60) Provisional application No. 60/491,098, filed on Jul. 30, 2003.

(51) Int. Cl.
*H01R 39/00* (2006.01)
*G06F 13/00* (2006.01)

(52) U.S. Cl. .................. 710/106; 307/145; 307/413; 340/286.02

(58) Field of Classification Search ............... 710/100; 701/1, 45, 48; 713/300; 340/310.11, 438, 340/870.2, 870.18, 825.2, 870.7, 310.16, 340/825.57; 307/10.1; 375/257, 355; 280/735; 370/489

See application file for complete search history.

(56) References Cited

U.S. PATENT DOCUMENTS

| | | | | |
|---|---|---|---|---|
| 3,659,277 | A | * | 4/1972 | Brown ................... 340/870.2 |
| 4,737,787 | A | * | 4/1988 | Ito et al. ................ 340/870.18 |
| 5,122,794 | A | * | 6/1992 | Warrior ................... 340/825.2 |
| 5,412,369 | A | * | 5/1995 | Kirchner ................... 375/355 |
| 5,629,847 | A | * | 5/1997 | Shirakawa et al. ........... 701/45 |
| 5,964,816 | A | * | 10/1999 | Kincaid ...................... 701/45 |
| 6,046,511 | A | * | 4/2000 | Kincaid .................... 307/10.1 |
| 6,172,615 | B1 | * | 1/2001 | Kogure .................. 340/870.02 |
| 6,188,314 | B1 | * | 2/2001 | Wallace et al. ............. 340/438 |
| 6,212,457 | B1 | * | 4/2001 | Miciuda et al. ............... 701/45 |

(Continued)

FOREIGN PATENT DOCUMENTS

DE 19944967 A1 * 5/2001

*Primary Examiner*—Christopher E. Lee
(74) *Attorney, Agent, or Firm*—Jimmy L. Funke

(57) ABSTRACT

The present invention provides a system of and a method for multiple transmitters to communicate data over a single uni-directional communication bus. In one form of the present invention, a data communication system using time-domain multiplexing includes a uni-directional current-modulated communication bus, a plurality of sensors coupled to the communication bus, at least one of the sensors capable of detecting the data transmission of a sensor outside of the current loop of the first sensor, the sensors also capable of transmitting data on the communication bus using current loop modulation. In another form of the present invention, a method of transmitting data on a uni-directional communication bus is provided. The method includes the steps of enabling a first device to transmit a data signal on the communication bus, the data transmission followed by an idle period, and the first device including a current sensor; enabling a second device to detect the first device's data transmission and the idle period; and enabling the first device to transmit data upon detecting the idle period, the first device positioned in a first current loop and the second device positioned in a second current loop outside of the first current loop, the second current loop passing through the current sensor of the first device.

10 Claims, 7 Drawing Sheets

U.S. PATENT DOCUMENTS

| | | | |
|---|---|---|---|
| 6,229,434 B1 * | 5/2001 | Knapp et al. | 340/310.16 |
| 6,275,167 B1 * | 8/2001 | Dombrowski et al. | 340/825.57 |
| 6,424,900 B2 * | 7/2002 | Murray et al. | 701/48 |
| 6,553,076 B1 * | 4/2003 | Huang | 375/257 |
| 6,563,419 B1 * | 5/2003 | Herz et al. | 340/310.11 |
| 6,565,119 B2 * | 5/2003 | Fogle, Jr. | 280/735 |
| 6,665,593 B2 * | 12/2003 | Otterbach et al. | 701/1 |
| 6,694,439 B2 * | 2/2004 | Cho et al. | 713/300 |
| 6,895,022 B1 * | 5/2005 | Kincaid | 370/489 |
| 6,937,160 B2 * | 8/2005 | Wagner et al. | 340/870.07 |
| 6,943,669 B2 * | 9/2005 | Otterbach et al. | 340/438 |

* cited by examiner

METHOD FOR MULTIPLE SENSORS TO COMMUNICATE ON A UNI-DIRECTIONAL BUS

This application claims the benefit of U.S. Provisional Patent Application No. 60/491,098 filed on Jul. 30, 2003.

TECHNICAL BACKGROUND

The invention generally relates to communication systems. More specifically, the field of invention is crash sensing systems.

BACKGROUND OF THE INVENTION

Crash sensing systems are used in vehicles to control restraints (e.g. air bags, pretensioners, etc.) in order to prevent or reduce injury to occupants of vehicles resulting from collisions with other vehicles or objects. The performance of these crash sensing systems is highly dependent on data from transmitting sensors in various locations on the vehicle, especially those transmitting sensors near a point of contact in the collision event. The proximity of these sensors to the point of contact places them within the "crush zone," which is the portion of the vehicle structure that is deformed, or crushed, by the collision event.

Transmitting sensors in the "crush zone" of the vehicle are typically located within one (1) to twelve (12) inches (2.54–30.48 cm) of a point of contact in the collision. The proximity of the sensor to these points of contact provides the restraint control system with data about the event very quickly—usually within milliseconds after the event begins. Since these sensors are located a significant distance from the primary restraint control unit ("RCU"), they are often referred to as remote or satellite sensors.

The present state-of-the-art for data transmission from crush zone sensors consists primarily of two methods. The first method ("Method 1"), is a separate, dedicated connection between transmitting sensors and a RCU as shown in data communication system 100 of FIG. 1. The most common and efficient communication technique for Method 1 is a current modulation method providing uni-directional communication between each transmitting sensor 102, 104, 106 and RCU 108. The method works as shown in the simplified single satellite system 200 of FIG. 2.

RCU 202 provides power source 204 for transmitting sensor 206. Power source 204 creates a voltage differential between wires 208, 210 connecting transmitting sensor 206 to RCU 202. Transmitting sensor 206 draws an electrical current from power source 204 that flows to transmitting sensor 206 through wire 208, flows through transmitting sensor 206, and flows back to power source 204 through wire 210. The current flow is indicated by flow arrow 212. The current that flows through wire 210 flows through power source 204 and back into wire 208. This continuous circulation of current is known to those skilled in the art as a current loop. Transmitting sensor 206 communicates to RCU 202 by modulating the amplitude of the current flow. A detector within power source 204 detects the current modulation and senses the communication from transmitting sensor 206. This method is therefore known to those skilled in the art as current loop modulation. The architecture of a system using Method 1 requires that an additional interface be created for each transmitting sensor added to system 100. Referring again to FIG. 1, the interface for transmitting sensors 102, 104, 106 consists of wiring between transmitting sensors 102, 104, 106 and RCU 108, connector pins at RCU 108, and interface circuitry within RCU 108. The incremental cost of adding a transmitting sensor to system 100 implementing Method 1 is the cost of the additional transmitting sensor and the interface for that sensor. The incremental cost is approximately the same as the cost of the first satellite sensor interface.

The second state-of-the-art method for data transmission ("Method 2"), is based on a bussed concept as shown and implemented in data communication system 300 of FIG. 3. The architecture for a system implementing Method 2 typically requires bi-directional communication capability of most, if not all, nodes on the communication bus. The most common communication architecture uses a master-slave technique such that RCU 308 serves as the master. RCU 308 queries transmitting sensor 302, 304, 306 attached to communication bus 310, and the queried sensor responds with its data. In most cases, the architecture of system 300 requires relatively little modification or additional circuitry within RCU 308 for additional transmitting sensors added to system 300. However, there is a significantly higher initial cost within RCU 308 to provide support for bi-directional communication system 300. Since transmitting sensors 302, 304, 306 must also support bi-directional communication capability, transmitting sensors 302, 304, 306 have a higher cost than transmitting sensors 102, 104, 106 of system 100 (FIG. 1).

The architecture of system 300, in most cases, more easily accepts additional transmitting sensors by extending the existing communication wiring to the location of the new sensor and adding the sensor. Because there is little modification required to the interface, the incremental cost of adding a sensor to system 300 is limited to approximately the cost of the additional sensor. However, it is recognized that there are finite, practical limitations on the capacity of bus 310 due to limits on power, bandwidth, etc. In some cases, the desire to add a transmitting sensor to bus 310 may exceed one or more of the practical limitations for bus 310. In this case, the addition of a transmitting sensor requires the addition of another bus 310 to the system to accommodate the sensor. In this case, the incremental cost of the additional transmitting sensor would be large and possibly prohibitive. The initial cost for system 300 is higher than system 100, but the incremental cost for adding new sensors to system 300 should in most cases be lower than the cost of adding new sensors to system 100.

SUMMARY OF THE INVENTION

The present invention provides a data communication system that avoids some of the costs necessarily incurred with the implementation of the prior art systems, i.e., the costs of obtaining transmitting sensors with bi-directional communication capability, RCUs that support bi-directional communication capability, and interfaces to support each of these sensors. In one form of the present invention, a data communication system is provided, the system including at least one uni-directional communication bus, and a plurality of transmitting sensors coupled to the communication bus, at least one of the transmitting sensors capable of sensing a data transmission from other of the plurality of transmitting sensors.

In another form of the present invention, a method for multiple communication devices to communicate on a uni-directional communication bus is provided, the method including the steps of enabling a first device to transmit a data signal on the communication bus, the data transmission followed by an idle period, and the first device including a current sensor; enabling a second device to detect the first device's data transmission and the idle period; and enabling the first device to transmit data upon detecting the idle period, the first device positioned in a first current loop and the second device positioned in a second current loop outside of the first current loop, the second current loop passing through the current sensor of the first device.

DESCRIPTION OF THE DRAWING

The above-mentioned and other features and objects of this invention, and the manner of attaining them, will become more apparent and the invention itself will be better understood by reference to the following description of an embodiment of the invention taken in conjunction with the accompanying drawings, wherein.

Figure 1:
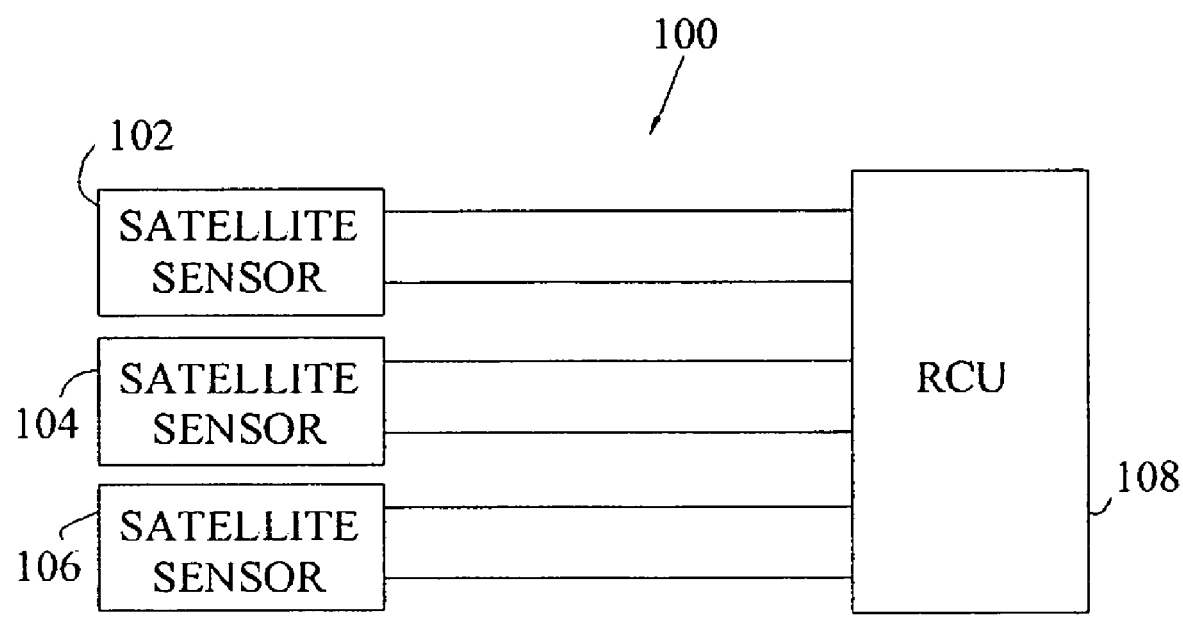
FIG. 1 is a schematic view of a prior art data communication system.
Figure 2:
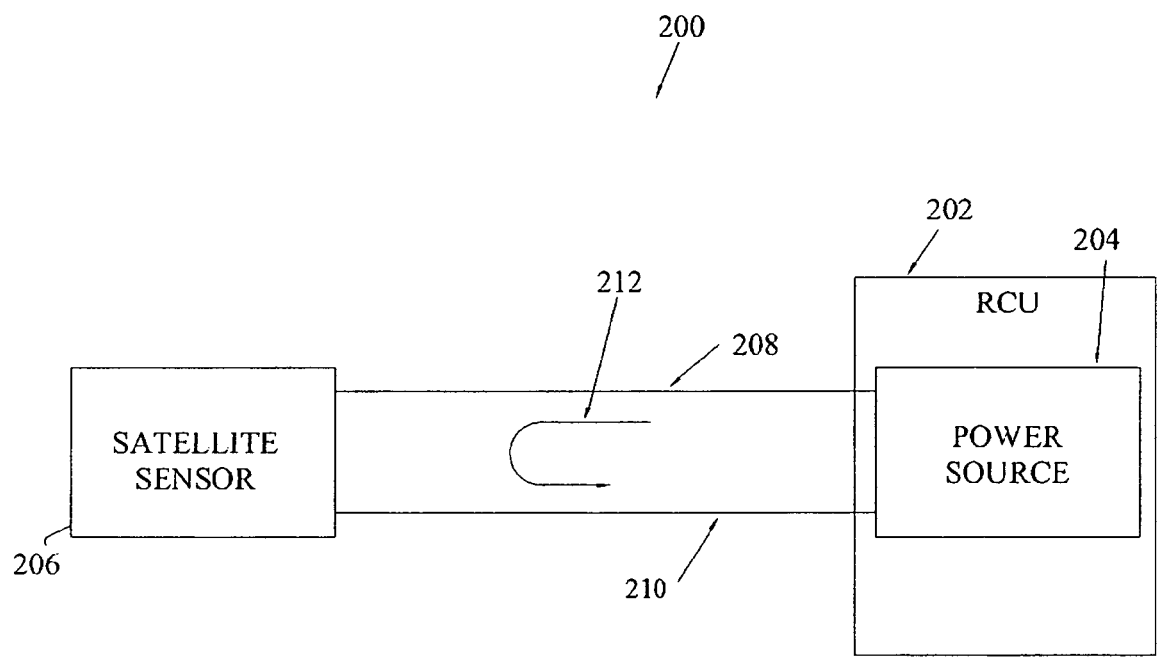
FIG. 2 is a schematic view of a data communication system implementing prior Method 1.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

Figure 4:
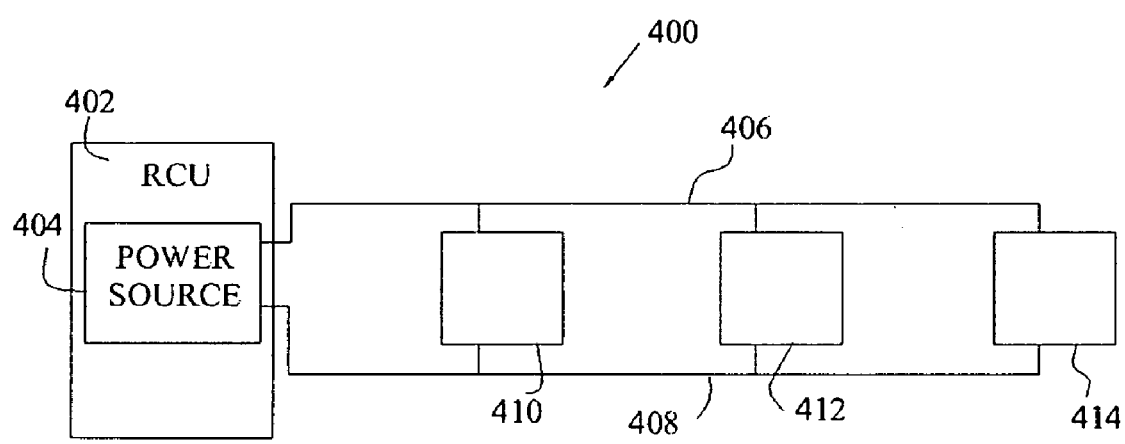
FIG. 4 is a schematic view of the architecture of a data communication system with multiple satellite current loops sharing a single interface at the RCU.

The present invention provides a system of and a method for multiple transmitting sensors to send data over a single uni-directional communication bus. The multiple transmitting sensors share the same bus by communicating in such a way that the communication from multiple transmitting sensors can be unambiguously distinguished at the RCU. The shared uni-directional current loop communication is configured as shown in FIG. 4.

In multiple satellite system 400, RCU 402 has power source 404 that produces a voltage differential between wire pair 406, 408. Transmitting sensors 410, 412, 414 are connected to power source 404 electrically in parallel with each other. Transmitting sensors 410, 412, 414 have shared use of wire pair 406, 408 without having to add bi-directional communication capability to wire pair 406, 408. The shared use is accomplished in such a way that power source 404 can sense the communication from each transmitting sensor 410, 412, 414 without loss of information from any transmitting sensor 410, 412, 414.

Three (3) data modulation techniques may be used by the transmitting sensors in communicating over the uni-directional communication bus. In a first embodiment of the present invention, a time-domain multiplexing technique is used. This method is based on the capabilities of one or more transmitting sensors to detect communication by other sensors and delay its own communication until the other transmitting sensors have stopped communicating. In this form of the invention, the satellites can be said to "take turns" using the communication bus.

In a second embodiment of the present invention, a frequency domain multiplexing technique is used. In frequency-domain multiplexing, each transmitting sensor is assigned a portion of the frequency spectrum that is separate from the portions assigned to all other transmitting sensors on the same bus. The power source can distinguish communication from different transmitting sensors by separating sensed communication into the discrete portions of the frequency domain used by each transmitting sensor.

In a third embodiment of the present invention, an amplitude domain multiplexing technique is used. This method is based on assigning a current modulation amplitude to each transmitting sensor such that the communication amplitude from any one or several transmitting sensors is unique to that one or several transmitting sensors. For example, transmitting sensors 410, 412, 414 may use a two state (idle/active) method of communication and may be assigned active communication amplitudes of 5 mA, 10 mA, and 20 mA, respectively. Accordingly, any combination of transmitting sensor communication states is uniquely distinguishable from any other combination of communication states because all of the possible combinations of states from transmitting sensors 410, 412, 414 produce a combined amplitude unique to that particular combination of states such that RCU 402 can determine the simultaneous states of all transmitting sensors 410, 412, 414. It is contemplated that other embodiments of the present invention may include coding techniques that are in whole or in part combinations of the above-described data modulation techniques.

Figure 5:
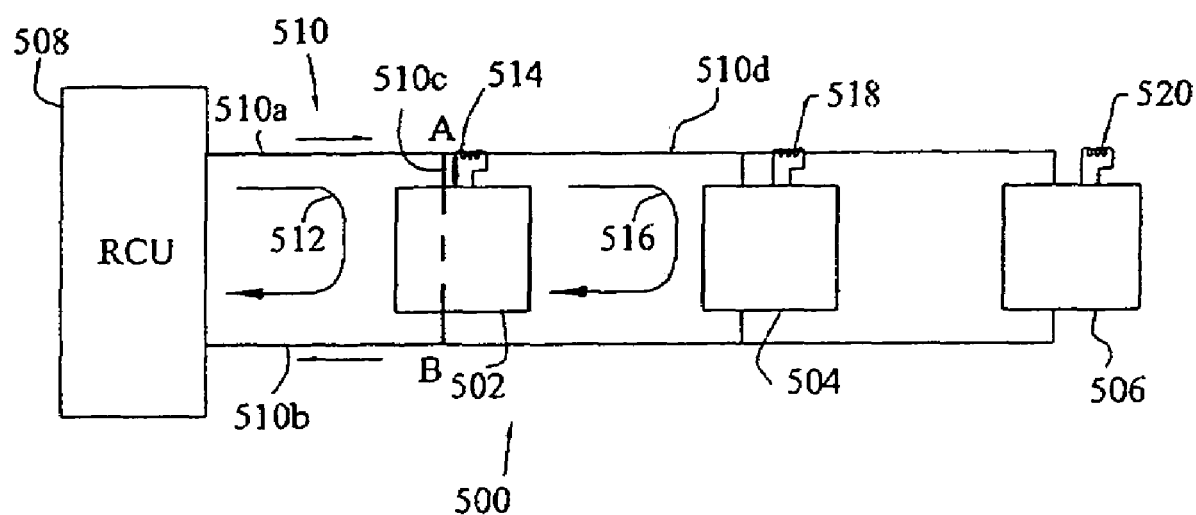
FIG. 5 is a schematic view of the data transmission method of the present invention.

Shown in FIG. 5 is the architectecture of data communication system 500 of the present invention implementing the time-domain multiplexing technique. System 500 includes master-less uni-directional communication bus 510, which uses current modulation for multiple transmitting sensors 502, 504, 506 in parallel. Data communication system 500 achieves the advantages of data communication systems implementing prior art Method 1 and prior art Method 2 without the inherent disadvantages of each method. The present invention is also broadly applicable to any network consisting of multiple nodes requiring only uni-directional communication.

Uni-directional communication bus 510 consists of multiple transmitting sensors 502, 504, 506 and single receiver 508. Transmitting sensor 502 is positioned within current loop 512 and includes current sensor 514. Transmitting sensor 504 is positioned within current loop 516 and includes current sensor 518. Current loops 512, 516 show the current flow and share the same circuit indicated by portions 510*a*, 510*b*. The currents for transmitting sensors 502, 504 flow through portion 510*a* of circuit 510 in the direction indicated by the directional arrow. When the combined currents reach point A, the current for transmitting sensor 502 flows through sensor 502 via portion 510c of circuit 510, while the current for transmitting sensor 504 continues to the right along portion 510d of circuit 510. The currents for transmitting sensors 502, 504 join together again at point B, and flow back into RCU 508 in the direction indicated by the lower directional arrow.

Because of the above-described current flows, transmitting sensors 502, 504 can detect data transmissions from transmitting sensors whose current loops pass through transmitting sensors' 502, 504 respective current sensors 514, 518. That is, transmitting sensor 502 may detect data transmissions from transmitting sensors 504, 506, and transmitting sensor 504 may detect data transmissions from transmitting sensor 506. Transmitting sensor 506 does not detect data transmissions from any other transmitting sensors because the currents for transmitting sensors 502, 504 do not pass through current sensor 520 of transmitting sensor 506. RCU 508 produces a voltage differential between circuit nodes 510a, 510b of communication bus 510. Transmitting sensor 502 senses the presence of sensors 504, 506 outside of its current loop 512 by detecting a current flowing through current sensor 514 located immediately outside of current loop 512. In the same manner, transmitting sensor 504 senses the presence of sensor 506 outside of its current loop 516 by detecting a current flowing through current sensor 518. The architecture of system 500 may include any number of transmitting sensors.

Sensors 502, 504 each schedule their respective data transmissions during periods when transmitting sensors outside of their respective current loops 512, 516 are not communicating. The actual number of transmitting sensors in a given application is ultimately limited by the needs of the application, or some other practical limit of the communication system (current capacity, bandwidth, etc.).

Figure 6:
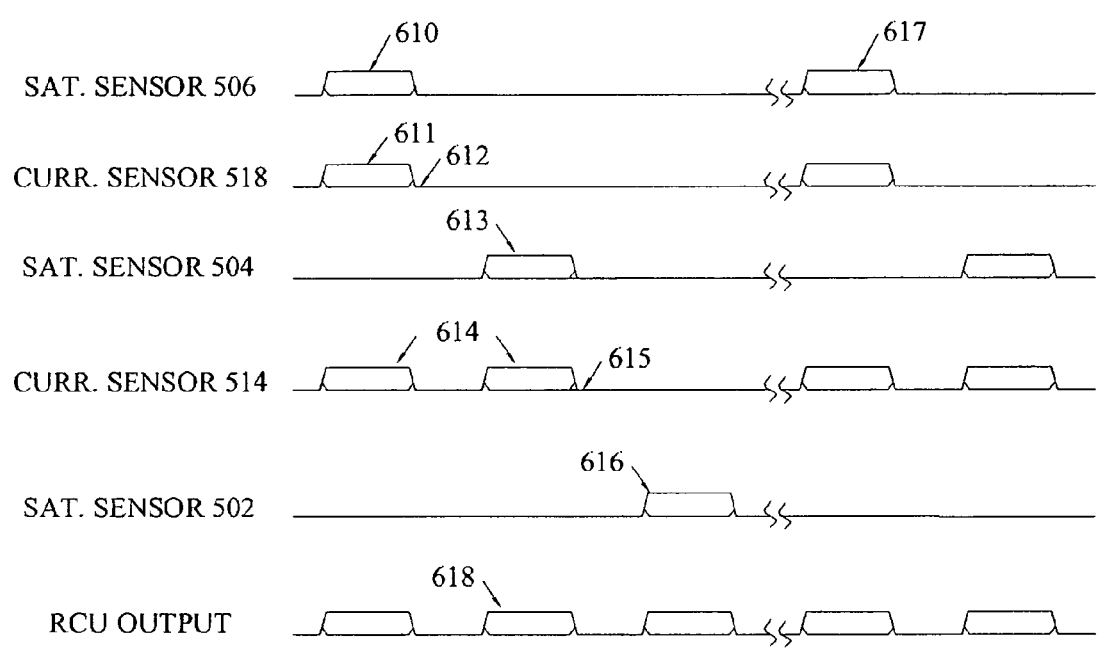
FIG. 6 is an illustrative view of data transmissions schedule generated by the data communication system of FIG. 5.

FIG. 6 illustrates an example of data transmissions scheduled and generated by data communication system 500 of FIG. 5. The communication sequence begins with a message transmitted by transmitting sensor 506 (610). This data transmission is detected by current sensor 518 as shown by the sensor output trace (611). When transmitting sensor 504 detects the idle period following the data transmission from sensor 506 (612), sensor 504 transmits its own message (613). Current sensor 514 detects the data transmissions of both transmitting sensors 504, 506 (614). When sensor 502 detects the idle period following the end of transmission from both sensors 504, 506 (615), sensor 502 transmits its own message (616). Some time after sensor 502 completes its transmission, sensor 506 may transmit another message (617), thus initiating another communication sequence. The communication current generated at RCU 508 output by the transmissions from all three sensors 502, 504, 506 together is shown by the bottom trace (618).

In an exemplary embodiment of the present invention, the message length and transmission frequency of each transmitting sensor 502, 504, 506 is chosen such that the total capacity of communication bus 510 (FIG. 5) is not exceeded. For instance, the communication sequence shown in FIG. 6 would not be possible if each sensor 502, 504, 506 had a ratio of message length to repetition interval (i.e. transmission duty-cycle) of fifty-percent (50%), because all three (3) sensors 502, 504, 506 together would require 150% of communication bus 510 capacity. Also, in an exemplary embodiment of the present invention, sensor 502, 504, 506 send data at the same rate and communicate once during each sequence. In other embodiments of the invention, however, satellites with different data rates may be used.

The present invention provides numerous advantages over prior art systems that implement Methods 1 or 2. The system of the present invention permits the use of a lower cost, uni-directional interface in RCU 508 described for systems implementing prior art Method 1. It also enables a single interface to serve multiple transmitting sensors, thereby resulting in a lower cost per sensor 502, 504, 506 compared to systems implementing prior art Methods 1 and 2. The system of the present invention further requires each sensor 502, 504, 506 in the system to have the ability to detect communication by other transmitting sensors in the system. By using the present invention, this capability can be achieved at a lower cost than the bi-directional capability required for the transmitting sensors in systems using prior art Method 2. Further, the system of the present invention potentially reduces wiring cost and vehicle weight because the overall length of the wiring is decreased.

Figure 7A:
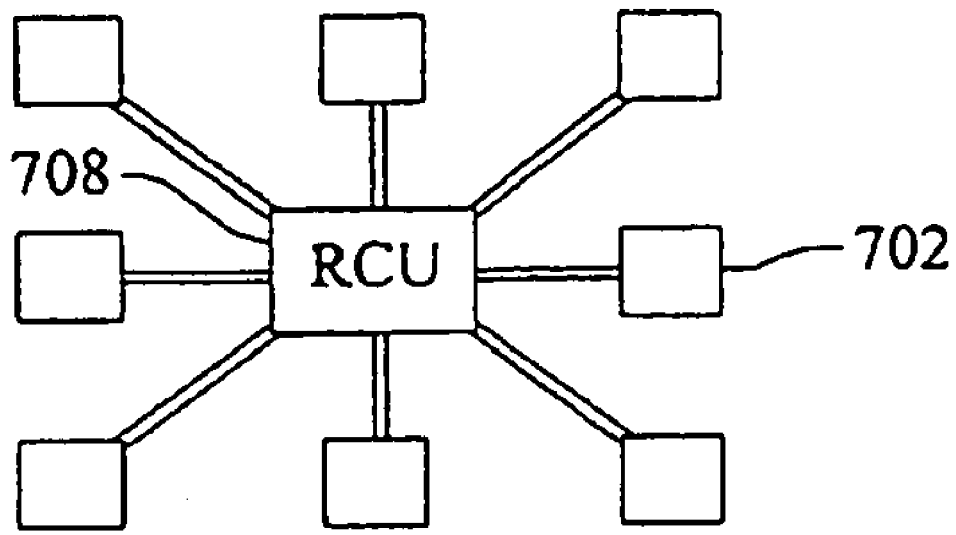
FIG. 7A is a schematic view of the only architecture option for prior art systems implementing Method 1 as well as an architecture option for the inventive system and method.

Not only does the present invention provide cost savings, it enables practical system architecture alternatives that are not available within the prior art. Consider the system configurations shown in FIGS. 7A and 7B. FIG. 7A shows the only system architecture option for systems using prior art Method 1. The use of prior art method 2 enables the architecture shown in FIG. 7B. However, Method 2 has limited application because the high initial cost of the bi-directional interfaces in RCU 708 and transmitting sensors 702 require a large number of sensors in the system before the break-even cost is achieved with Method 1. In some cases, the number of transmitting sensors required to reach a break-even cost with Method 1 may require more sensors than bus 710 is capable of supporting, and thus the break-even cost can never be achieved.

Figure 7B:
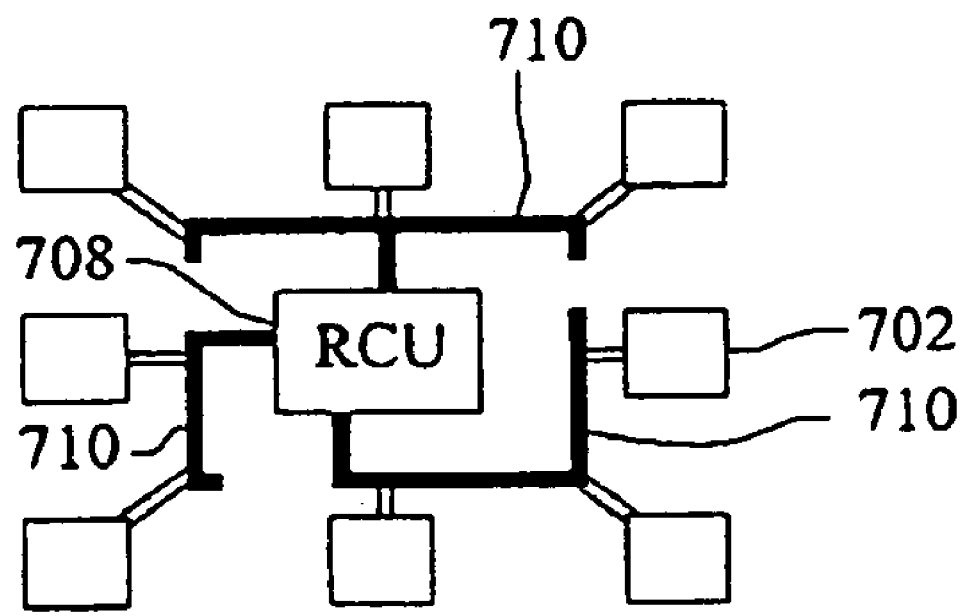
FIG. 7B is a schematic view of an architecture option for systems implementing prior art Method 2 as well as an architecture option for the inventive system and method.

The present invention enables use of either configuration shown in FIG. 7. A preferred embodiment is the configuration shown in FIG. 7B because it represents an optimum compromise between system cost and system reliability. The number of interfaces in the configuration shown in FIG. 7B is reduced from the eight (8) interfaces shown in the configuration displayed in FIG. 7A to only three (3) interfaces. This architecture provides a potential interface cost reduction. The compromise in system reliability is minimal since busses 710 can be dedicated to different zones of a vehicle (e.g. front, driver side, and passenger side). The failure of any one zone represents only a partial loss of overall system function.

Figure 3:
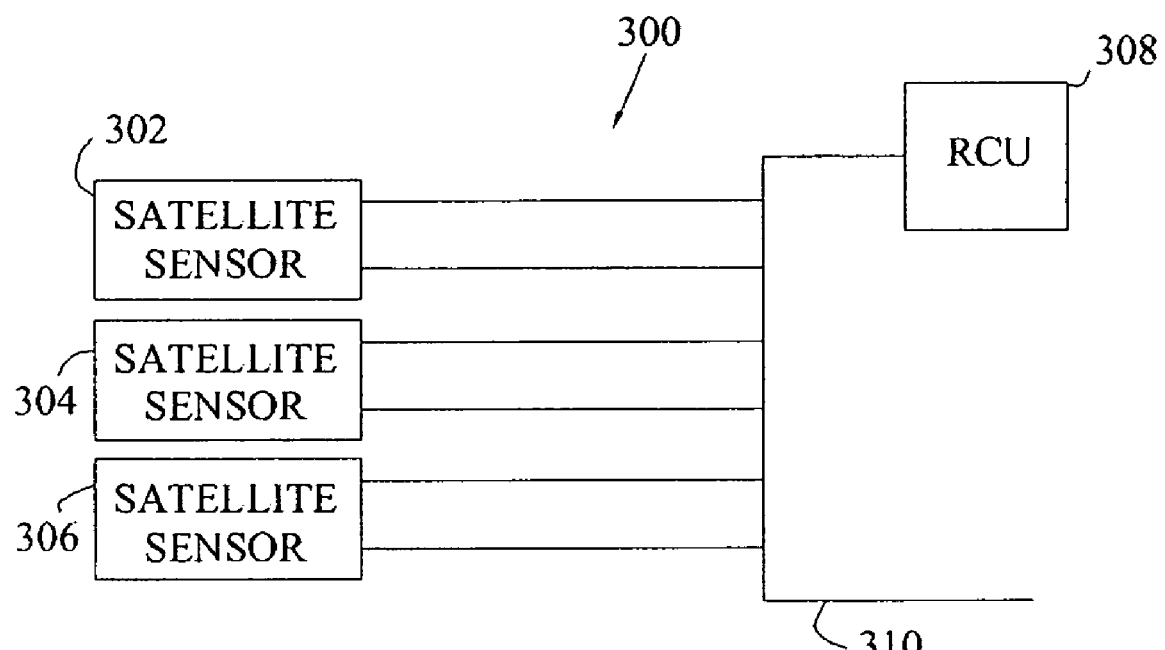
FIG. 3 is a schematic view of a data communication system implementing prior art Method 2.

This present invention also enables a data communication system design with lower emissions. Referring to FIG. 3, the implementation of prior art Method 2 requires master-slave communication bus 310. Communication bus 310 requires bandwidth to support communication from master 308 as well as response from slave devices 302, 304, 306. System 500 (FIG. 5) of the present invention, however, requires bandwidth only for "slave" devices 502, 504, 506. Not only does the system of the present invention require less bandwidth, but a master-slave bus arrangement must be operated continuously. There is no way for the master to determine when an event is occurring except by continuously querying the slave devices for data. However, system 500 of the present invention enables transmitting sensors 502, 504, 506 to remain silent until there is data of sufficient significance to report. The result is that communication bus 510 is essentially idle with little or no transmission (or resulting emissions) until an event occurs producing significant data requiring transmission.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

I claim:

1. A data communication system comprising: at least one unidirectional communication bus; and a plurality of transmitting sensors coupled to said at least one communication bus, at least one of said plurality of transmitting sensors capable of sensing a data transmission from other of said plurality of transmitting sensors, wherein at least one of said plurality of transmitting sensors is positioned within a current loop and is capable of sensing data transmission from other of said plurality of said transmitting sensors positioned outside of the current loop.

2. A data communication system comprising: at least one unidirectional communication bus; and a plurality of transmitting sensors coupled to said at least one communication bus, at least one of said plurality of transmitting sensors capable of sensing a data transmission from other of said plurality of transmitting sensors, wherein at least one of said plurality of transmitting sensors is positioned within a current loop and is capable of sensing data transmission from other of said plurality of said transmitting sensors positioned outside of the current loop and wherein said plurality of transmitting sensors include a first device and a second device, the first device including a first current sensor and positioned in a first current loop, and the second device positioned in a second current loop outside of the first current loop.

3. The data communication system of claim 2 wherein the second current loop passes through the first current sensor.

4. In a data communication system including a unidirectional communication bus and multiple devices coupled to the communication bus, a method for the multiple devices to communicate, said method comprising the steps of: enabling a first device to transmit a data signal on the communication bus, the data signal transmission followed by an idle period, and the first device including a current sensor; enabling a second device to detect the first device's data transmission and the idle period; and enabling the first device to transmit data upon detecting the idle period, the first device positioned in a first current loop and the second device positioned in a second current loop outside of the first current loop, the second current loop passing through the current sensor of the first device.

5. The method of claim 4 further including a step of enabling the first and the second device to use at least one of time-domain multiplexing, amplitude-domain multiplexing and frequency-domain multiplexing to communicate data.

6. The method of claim 4 further including the steps of: assigning a unique current modulation amplitude to The first, the second and a third device, each of the devices having a communication state, wherein any combination of the first, the second and the Third devices' communication states is distinguishable from any other combination of The first, the second and the third devices' communication states; and enabling a control unit coupled to the communication bus to determine the simultaneous communication states of the first, the second and the third device.

7. The method of claim 6 wherein the communication state includes one of an idle and an active state.

8. The method of claim 6 further including the step of enabling the second device to transmit a data signal, the data signals transmitted by the first and the second devices comprising a frequency spectrum.

9. The method of claim 6 further including the steps of: assigning a portion of the frequency spectrum to each of the first and the second devices for use when transmitting data signals; enabling a power source in the control unit to sense communication from the first and the second devices; and enabling the power source to distinguish the communication by separating the sensed communication into the portions of the frequency spectrum used by the first and the second devices.

10. A data communication system comprising:

a unidirectional, two-line communication bus having a first end;

a plurality of transmitting sensors connected In parallel across the communication bus in increasing order from the first end of the communication bus;

a control unit connected to the first end of the communication bus and including a power source capable of providing current levels and sensing communication from said plurality of transmitting sensors, wherein the transmitting sensors provide messages to the control unit by modulating current in the communication bus;

a plurality of current sensors responsive to current in portions of the communication bus between the transmitting sensors, wherein each of the transmitting sensors except the transmitting sensor furthest from the control unit is responsive to one of the current sensors between itself and the adjacent one of the transmitting sensors further from the control unit to receive messages via the communication bus from others of the transmitting sensors further from the control unit than the one of the transmitting sensors.

\* \* \* \* \*